United States Patent [19]

Imaino et al.

[11] Patent Number: 4,577,503
[45] Date of Patent: Mar. 25, 1986

[54] METHOD AND DEVICE FOR DETECTING A SPECIFIC ACOUSTIC SPECTRAL FEATURE

[75] Inventors: Wayne I. Imaino, San Jose; Andrew C. Tam, Saratoga, both of Calif.

[73] Assignee: International Business Machines Corporation, Armonk, N.Y.

[21] Appl. No.: 646,406

[22] Filed: Sep. 4, 1984

[51] Int. Cl.$^4$ .......................................... G01N 29/00
[52] U.S. Cl. ..................................... 73/602; 73/599; 73/579; 73/645
[58] Field of Search ................. 73/602, 579, 586, 599, 73/645; 364/576

[56] References Cited

U.S. PATENT DOCUMENTS

| | | | |
|---|---|---|---|
| 3,290,922 | 12/1966 | Thompson | 73/52 |
| 3,572,099 | 3/1971 | Wieczorek | 73/602 |
| 3,872,443 | 3/1975 | Ott | 73/579 |
| 3,952,578 | 4/1976 | Jacobs | 73/64.1 |
| 3,968,680 | 7/1976 | Vopilkin et al. | 73/602 |
| 4,117,731 | 10/1978 | Heyman | 73/579 |
| 4,167,879 | 9/1979 | Pedersen | 73/610 |
| 4,202,215 | 5/1980 | Meyer | 73/599 |
| 4,297,035 | 10/1981 | Bjorklund | 356/402 |
| 4,383,446 | 5/1983 | Roeder et al. | 73/579 |

Primary Examiner—Howard A. Birmiel
Attorney, Agent, or Firm—Joseph E. Kieninger; F. David LaRiviere

[57] ABSTRACT

A method and device for detecting a narrow acoustic spectral feature in a sample as described. The method uses an electrical frequency modulated (FM) signal that is obtained from a voltage controlled oscillator. The Fourier spectrum of this wave is a main frequency $f_c$ with two small sidebands at frequencies $f_c \pm f_s$. This whole triplet is slowly swept in frequency by a slow sawtooth generator. The electrical signal is fed into a flat acoustic transducer; the acoustic wave is then transmitted through an acoustically active medium, i.e. the sample, and detected by another flat acoustic transducer which produces an FM signal with a superposed amplitude modulated (AM) signal if one of the sidebands overlaps an acoustic feature. This electrical signal is then demodulated to give a pure AM signal which can be phase sensitive detected by using a lock-in amplifier. By suitable adjustment of the phase setting of the lock-in amplifier both the "in-phase" and "out-of-phase" signals of the detected acoustic signal can be detected.

11 Claims, 3 Drawing Figures

METHOD AND DEVICE FOR DETECTING A SPECIFIC ACOUSTIC SPECTRAL FEATURE

DESCRIPTION

TECHNICAL FIELD

This invention relates to acoustic spectroscopy and more particularly to a method and apparatus for detecting one or more acoustic spectral features in a sample.

BACKGROUND ART

Methods for detecting specific acoustic spectral features are described in U.S. Pat. Nos. 4,117,731; 3,952,578; 4,383,446; 4,167,879; 3,572,099 and 3,290,922. The acoustic methods in these patents are all based on the frequency-sweeping of a single instantaneous frequency acting on a sample and examining the transmitted or scattered acoustic signal which is of nearly the same shape as the incident signal. As shown in FIG. 1, an incident beam 10 in accordance with these prior art acoustic methods having a waveform shape 12 is directed at a sample 14. The beam 16 emerging from the sample 14 has a waveform 18. The instantaneous Fourier spectra 20 and 22 of the instant beam 10 and transmitted beam 16, respectively are also shown. P(t) is the field variation with time 5, while I(f) is the Fourier intensity at frequency f. The problem with these acoustic methods is that the intensity of the waveform is smaller than and the frequency of the transmitted beam is the same as that of the incident beam. As a result, these methods are not as accurate and precise as desired.

The patent Bjorklund, U.S. Pat. No. 4,297,035, describes an optical method which uses a beam which is modulated with a single RF frequency to provide a pure FM spectrum having upper and lower sidebands. The sample is exposed to the modulated beam so that only one of the FM sidebands probes the narrow spectral feature. The light emerging from the sample is photodetected to provide a RF beat. The amplitude of this RF beat is monitored to indicate the strength of the narrow spectral feature. This optical method deals with optical parameters which are of an altogether different magnitude from acoustic parameters. For example, the optical method involves a wavelength of $10^{-6}$ meters whereas an acoustic method is concerned with wavelengths of 10 meters to $10^{-5}$ meters. Hence, acoustic wavelengths may be 40,000 times larger than the optical wavelengths and diffraction effects would be much stronger. The optical method wavespeed is $3 \times 10^8$ meter per second, whereas an acoustic wavespeed is $3 \times 10^2$ meter per second. Since the acoustic wavespeed is slower by one million times it would be reasonable to expect excessive signal temporal spread to occur. The optical method probes molecules having sizes of $10^{-10}$ meters whereas an acoustic method probes acoustic absorbers having sizes of 10 meters to $10^{-5}$ meters. As a result of this larger size of the active species, the coherent effect may not be observable for wave scattering from large objects. The optical method is concerned with vibrating electromagnetic fields propagating in space whereas the acoustic method deals with compression and rarefaction fluctuations in materials.

SUMMARY OF THE INVENTION

It is a primary object of this invention to provide an improved method and apparatus for detecting a single narrow acoustic spectral feature.

It is another object of this invention to provide an improved method and apparatus for detecting a plurality of narrow acoustic spectral features.

It is still another object of this invention to provide an improved method and apparatus for detecting a plurality of narrow acoustic spectral features simultaneously.

It is yet still another object of this invention to provide an improved method and apparatus highly sensitive to the presence of a narrow acoustic spectral feature.

It is a further object of this invention to provide an improved method and apparatus for the rapid multiplex readout of a plurality of narrow acoustic spectral features without requiring any tuning of the acoustic source.

These and other objects are accomplished by an acoustic method and apparatus which uses an electrical frequency modulated (FM) signal that is obtained from a sine-wave oscillator. The Fourier spectrum of this wave is a main frequency, $f_c$, and two sidebands at $f_c \pm f_s$ where $f_s$ is the modulation frequency. This whole triplet is slowly swept in frequency by a slow sawtooth generator. The electrical signal is fed into a flat acoustic transducer; the acoustic wave is then transmitted through an acoustically active medium, i.e. the sample, and detected by another flat acoustic transducer which produces an FM signal with a superposed amplitude modulated (AM) signal if one of the sidebands overlaps an acoustic feature. This electrical signal is then demodulated to give a pure AM signal which can be phase sensitive detected by using a lock-in amplifier. By suitable adjustment of the phase setting of the lock-in amplifier both the "in-phase" and "out-of-phase" signals of the detected acoustic signal can be detected.

Other objects of this invention will be apparent from the following detailed description, reference being made to the following drawings in which a specific embodiment is shown.

DESCRIPTION OF THE PREFERRED EMBODIMENT

Figure 1:
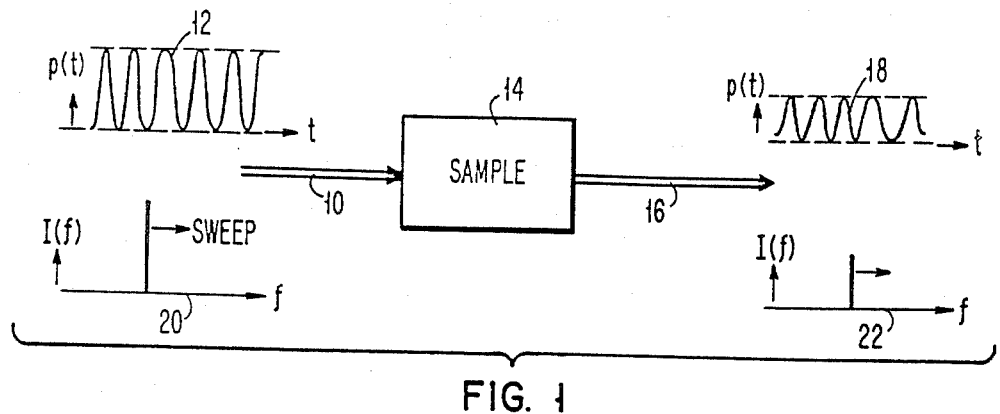
FIG. 1 illustrates the prior art sweep frequency acoustic testing method.
Figure 2:
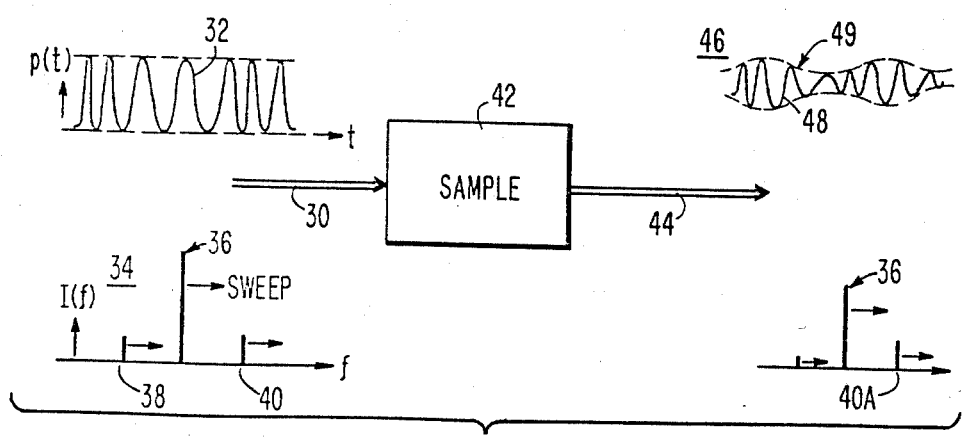
FIG. 2 illustrates the acoustic testing method in accordance with the present invention.

In accordance with this invention as shown in FIG. 2, an incident acoustic beam 30 having a waveform shape 32 is modulated with a single frequency to provide a Fourier spectrum 34 with a carrier frequency 36 and two sidebands 38 and 40. The sidebands 38 and 40 are positioned on opposite sides of the carrier frequency 36 and are balanced, i.e. they are equal in size. The modulated acoustic beam 30 is passed through the sample 42 and emerges as transmitted or scattered acoustic beam 44. The waveform 46 of the scattered beam 44 consists of an FM signal 48 with a superposed amplitude modulated (AM) envelope 49 if one of the sidebands 40A overlaps an acoustic feature.

Figure 3:
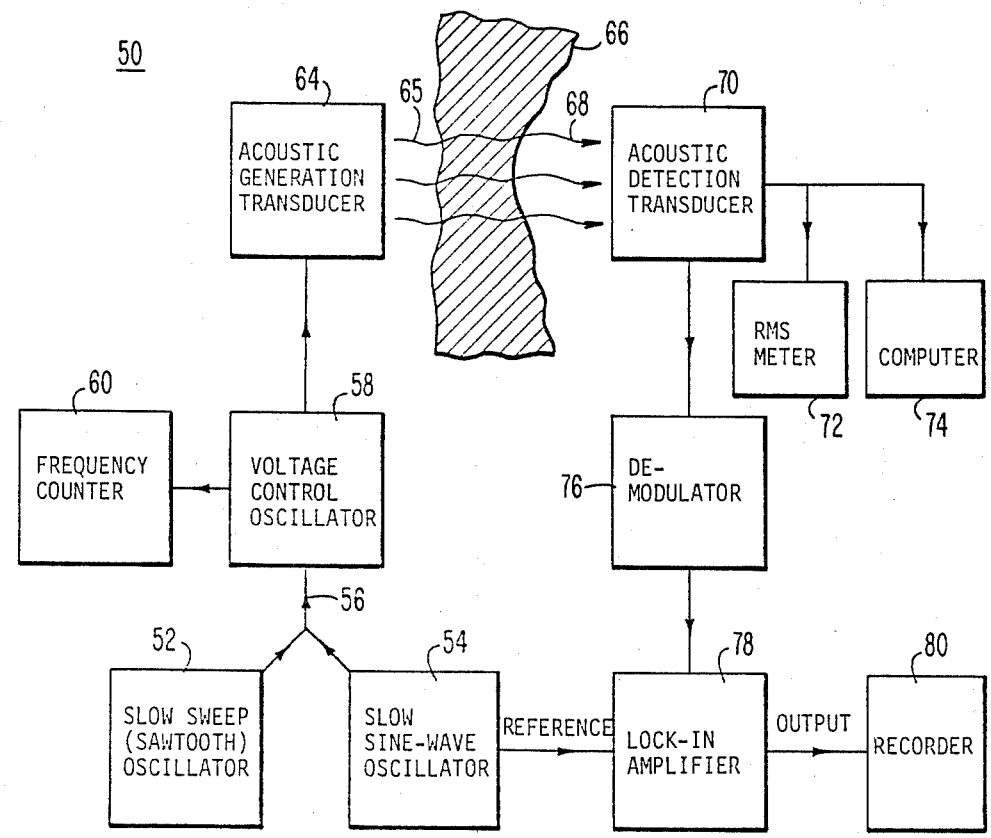
FIG. 3 is a schematic of a device in accordance with an embodiment of the present invention.

In a preferred embodiment FIG. 3 shows a multiplex readout device 50 for the detection of acoustic resonances in mechanical systems or parts of mechanical systems. A slow sweep sawtooth generator 52 and a sine-wave oscillator 54 combine to produce a wave 56 that is fed to a voltage controlled oscillator 58. A frequency counter 60 is connected to oscillator 58 for frequency monitoring. The oscillator 58 produces a FM modulated signal with a carrier frequency with two sidebands. These signals are passed into an acoustic generation transducer 64. Then acoustic waves 65 are incident onto the sample 66 which is an absorption, scattering or resonating medium. The acoustic waves 68 transmitted or scattered from the sample 66 pass into acoustic detection transducer 70 which produces an FM electrical signal with superposed AM if one of the sidebands overlaps an acoustic feature. Transducers 64 and 70 may be commercially available transducers such as microphones or lead zirconate titanate piezoelectric elements. Connected to the transducer 70 is a root-mean-square (RMS) meter 72 and a computer 74. The RMS meter measures the amplitude of the transmitted wave to compare with our present method. The computer is indicated in the figure to show that the demodulation and signal processing can also be done by software. The electrical signal from the transducer 70 is then demodulated in demodulator 76 to give a pure AM signal which is phase-sensitive detected by lock-in-amplifier 78. By suitable adjustment of the phase setting of the lock-in-amplifier 78 with respect to the reference signal provided by oscillator 54, both the "in-phase" and "out-of-phase" signals of the detected acoustic signal can be recorded by recorder 80. The in-phase signal is directly proportional to the absorption of the sample, whereas the out-of-phase signal is directly proportional to the velocity dispersion in the sample.

In accordance with this invention the presence of an acoustic resonance in the sample will cause a differential absorption or phase shift between the incident and emerging upper and lower FM sidebands. Such a difference will produce a heterodyne amplified beat signal at the corresponding RF or audio frequency. If there is no acoustic resonance or absorption, no beat signal is produced.

The design of the electrical multiplexing circuit 52, 54 and 58 combined, and lock-in amplifier 78 are straight forward and represent the present state of the art. The design of the phase sensitive analyzing means for detecting acoustic resonances can be using a lock-in amplifier 78, or using a computer 74 with an analog-to-digital, converter, where the phase sensitive multiplexing occurs through Fast Fourier Transformation in the software.

Although a preferred embodiment has been described, it is understood that numerous variations may be made in accordance with the principles of this invention.

We claim:

1. A method of detecting a single spectral feature in the acoustic response of a sample under test, said method comprising the steps of:
   providing an acoustical beam having a frequency bandwidth which is narrower than the width of the spectral feature, and having a center frequency $f_c$ which lies near the feature;
   modulating the acoustical beam with a single frequency $f_s$ to provide a pure FM spectrum having upper and lower sidebands;
   exposing the sample to the modulated acoustical beam so that only one of the FM sidebands probes the spectral feature; and
   detecting the amplitude modulation (AM) of the acoustical beam emerging from the sample at the frequency $f_s$ to determine the strength of the spectral feature.

2. A method as described in claim 1 further including the steps of:
   detecting the in-phase component of the AM of the acoustical beam emerging from the sample with respect to the modulating signal frequency $f_s$; and
   measuring the amplitude of the in-phase component of the AM for determining the absorption characteristic of the sample.

3. A method as described in claim 1 wherein the modulating frequency is swept to provide a spectrum of the spectral feature.

4. A method as in claim 1 further including the steps of:
   detecting the out-of-phase components of the AM of the acoustical beam emerging from the sample with respect to the modulating signal frequency $f_s$; and
   measuring the amplitude of the out-of-phase component of the AM for determining the velocity dispersion characteristics of the sample.

5. A method of detecting and recovering information contained in a spectral feature of the acoustical response of a sample whose absorption and velocity of acoustical beams vary with time and frequency, said method comprising the steps of:
   providing an acoustical beam having a frequency bandwidth which is narrower than the desired resolution of the information in the spectral feature;
   modulating the acoustical beam with a plurality of frequencies to provide an FM spectrum having a plurality of upper and lower sidebands which are more widely spaced than the bandwidth of said acoustical beam;
   exposing the sample to the modulated acoustical beam so that only one of the sidebands probes the spectral feature; and
   detecting the amplitude modulation (AM) of the acoustical beam emerging from the sample at each of the modulation frequencies to determine the acoustical response of the sample.

6. A method as described in claim 5 further including the steps of:
   detecting the in-phase components of the AM of the acoustical beam emerging from the sample with respect to their corresponding modulation frequencies; and
   measuring the amplitude of the in-phase components of the AM for determining the absorption characteristics of the sample.

7. A method as described in claim 5 whereby the frequencies are chosen so that each spectral feature contained in the acoustical response of the sample is exposed to one of each pair of FM sidebands of the plurality of FM spectra.

8. An acoustic method as described in claim 5 whereby the bandwidth of the acoustic beam is centered at a frequency within the spectral feature.

9. An acoustic method as described in claim 5 whereby the bandwidth of the acoustic beam is centered at a frequency outside the spectral feature.

10. A method as in claim 5 further including the steps of:
   detecting the out-of-phase component of the AM of the acoustical beam emerging from the sample with respect to the plurality of modulation frequencies; and measuring the amplitude of the out-of-phase components of the AM for determining the velocity dispersion characteristics of the sample.

11. A device for detecting a spectral feature of a sample comprising:

an acoustical source for producing an acoustical beam having a frequency bandwidth which is narrower than the width of the spectral feature and having a center frequency $f_c$ which lies near the selected spectral feature;

modulator means for modulating the acoustical beam with a single frequency to produce a pure FM spectrum with upper and lower sidebands and for probing the selected spectral feature of the sample;

acoustical detection means for detecting the acoustical wave after it has emerged from the sample; and measuring means coupled to the acoustical detection means for measuring the intensity of the electrical signals at $f_s$ to determine the strength of the selected spectral feature.

* * * * *